United States Patent
Voigt

(10) Patent No.: US 6,904,441 B2
(45) Date of Patent: Jun. 7, 2005

(54) METHOD AND APPARATUS FOR PROVIDING FILE SYSTEM ACCESS TO A DISK ARRAY

(75) Inventor: Douglas L. Voigt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 09/819,265

(22) Filed: Mar. 27, 2001

(65) Prior Publication Data

US 2002/0143793 A1 Oct. 3, 2002

(51) Int. Cl.$^7$ .......................... G06F 12/00; G06F 17/30
(52) U.S. Cl. ......................... 707/205; 707/2; 707/200; 709/213
(58) Field of Search .................... 707/1, 2, 10, 101, 707/200, 205; 709/212–216, 200; 710/100; 717/200

(56) References Cited

U.S. PATENT DOCUMENTS

| | | | |
|---|---|---|---|
| 5,392,244 A | | 2/1995 | Jacobson et al. |
| 5,875,459 A | * | 2/1999 | Taoda .......................... 711/114 |
| 5,974,503 A | * | 10/1999 | Venkatesh et al. ........... 711/114 |
| 6,442,682 B1 | * | 8/2002 | Pothapragada et al. ......... 713/1 |

FOREIGN PATENT DOCUMENTS

| | | |
|---|---|---|
| EP | 1221646 A | 7/2002 |
| JP | 9223049 A | 2/1996 |

OTHER PUBLICATIONS

"Storage controller exploits file array technology", Maliniak L., Electronic Design, Apr. 6, 1998 at www.elecdesign.com/Globals/PlanetEE/Content/1144.html.
English language Abstract of JP9223049A, Patent Published Feb. 15, 1996, Patent Owner: Brother Ind.

* cited by examiner

*Primary Examiner*—Frantz Coby
*Assistant Examiner*—Marcin R Filipczyk

(57) ABSTRACT

A data storage system (201) includes file system processes (308), array controller processes (300), and one or more data storage devices (203) accessed through the array controller processes. Certain file system access operations are diverted from the file system processes (308) so that the array controller processes (300) can directly perform the requested access operation. The array controller processes (300) then communicate with the file system processes (308) so that the file system processes may update the file system data management arrangement as appropriate. In this way, the hierarchical file system management is maintained while the storage media may be accessed directly through the array controller processes (300) in response to a file system access operation request.

29 Claims, 6 Drawing Sheets

METHOD AND APPARATUS FOR PROVIDING FILE SYSTEM ACCESS TO A DISK ARRAY

TECHNICAL FIELD OF THE INVENTION

This invention relates to data storage systems used with computers and computer networks. In particular, the invention relates to a method and apparatus for accelerating file system access to a disk array. The invention encompasses both a data storage system and a method for accessing a data storage apparatus. The invention also encompasses a program product for servicing file system access operation requests from a file system client.

BACKGROUND OF THE INVENTION

File systems and disk arrays utilize two different methods for accessing data stored on a data storage medium. The two methods are distinguished by a number of characteristics. In a file system for example, files are accessed using a file abstraction. That is, data is represented by a file which may be opened, closed, created, deleted, read, and written. Data is managed in a file system through a hierarchy of files and directories. This hierarchical data management is commonly seen as a significant advantage over other data management schemes. File systems also support both data sharing and data storage device sharing. Security within data storage devices is based on file and directory level access control lists standardized as part of the file system protocols. Another advantage of file systems is that client/server compatibility is based on a small number of well-supported protocols. However, file system performance is reduced by data storage disk-resident file mapping arrangements which are required to map data for a file to physical or virtual locations of the storage media associated with a data storage device.

A disk array is a storage system that employs a number of separate storage devices or disks and manages data across all of the separate devices. These disk array storage systems are popular for implementing data storage redundancy schemes to guard against individual storage device failures. In contrast to a file system, data is accessed in a disk array using a block storage abstraction. That is, data is mapped to large contiguous storage spaces or logical units and is accessed as blocks contained in these logical units. Each block in a logical unit represents a certain amount of data storage space, commonly 512 bytes of storage space. The stored data in a disk array is managed as physical and virtual data storage devices represented by volumes and/or logical units. Although the block storage abstraction may improve the speed at which large amounts of data may be written and retrieved from the storage devices, there are a number of drawbacks associated with disk arrays as compared to file systems. One drawback is that client/server compatibility for disk arrays is subject to a variety of constraints that vary across clients and servers. Also, disk arrays support only device sharing but not data sharing. Furthermore, security within devices is based on vendor unique features.

FIG. 1 provides a diagrammatic representation of a prior art arrangement between a disk array system 100 and a file system 101. The arrangement includes an array of physical storage devices 102 which may be disk drives each connected for communication with an array controller 103. Array controller 103 is a processing device executing array control program processes to control devices 102 and manage the data stored across the devices. Array controller 103 communicates with a host computer 104 through a suitable communications arrangement as indicated by line 105. File system 101 is implemented through computer program processes executed by a processor at host computer 104. Although FIG. 1 shows the array controller as separate from the host computer, some prior art disk array systems combine the functions of the array controller and host processor in a single processing device dedicated to the disk array system. The cooperation between the disk array controller 103 and file system 101 is generally the same regardless of whether the array controller and file system processes are performed on a single processing device or separate processing devices.

In the prior art system 100 shown in FIG. 1, the file system and disk array controller processes can be thought of as two separate layers of processing which cooperate to provide access to the physical media included in storage devices 102. File system 101 is essentially interposed between the file system clients (not shown in FIG. 1) and disk array controller 103 which actually manages and controls access to devices 102. To read a file, for example, a file system client submits a read operation request to file system 101. This file system client comprises a program process which may be executed at host computer 104 or at a computer networked to the host computer. In any event, file system processes receive the request from the file system client and update the file system data management arrangement which stores the file name, usually various file attributes, and storage allocation information indicating where the data making up the file is stored. File system 101 then issues an appropriate instruction to disk array controller 103. Array controller 103 processes the instruction to read the requested file data from one or more storage devices 102. The data read from storage devices 102 is first cached in memory associated with array controller 103 and then directed to cache memory associated with file system 101. File system 101 then returns the requested data as directed by the read operation. This step of transferring data from disk array controller 103 to file system 101 before the data may be transferred to the file system imposes a performance penalty particularly where the file being accessed is a large file.

SUMMARY OF THE INVENTION

It is an object of the invention to provide a method and apparatus which overcome the above described problems associated with data storage systems. More particularly, it is an object of the invention to provide a method and apparatus which perform certain file system access operations outside of the file system while maintaining the file system hierarchical structure. It is also an object of the invention to provide a program product for servicing file system access operation requests in a manner which accelerates file system access to files stored through a disk array implementation.

These objects are accomplished in a system which includes file system processes, array controller processes, and one or more data storage devices accessed through the array controller processes. According to the invention, certain file system access operations are diverted from the file system processes so that the array controller processes can directly perform the requested access operation. The array controller processes then communicate with the file system processes so that the file system processes may update the file system data management arrangement as appropriate. In this way, the desirable hierarchical file system management is maintained while the storage media may be accessed directly through the array controller processes in response to a file system access operation request. This direct storage device access for file system access operations is particularly advantageous for large files.

As used in this disclosure, "file system processes" refers to software or computer program code executed by a suitable processing device to implement the file system. This program code includes code for implementing a data management arrangement for the file system. The file system data management arrangement includes information for each file managed by the file system, and this information may be stored in one or more data tables relating the file name to various attributes for the file and to storage allocation information for the file.

"Array controller processes" refers to the software or computer program code executed by a suitable processing device for controlling and managing an array of disks or other physical storage devices. These array controller processes include program code for interpreting a received command and mapping code for defining logical units in the physical storage devices and mapping data to the various logical units and to blocks contained in the various logical units. An example of array controller processes is described in U.S. Pat. No. 5,392,244, the entire content of which is incorporated herein by this reference. In that example, the array controller processes are performed by an array controller separate from a host computer to which the illustrated disk array is connected, while the file system processes are performed by a processor associated with the host computer.

A "file system access operation request" as used in this disclosure comprises a computer readable code representing a request for a particular file system operation involving a file. File system access operations include operations to create, delete, open, close, read, or write a file. These file system access operation requests are communicated to the data storage system according to the invention by file system clients connected to the system by a suitable computer network communications arrangement. File system access operations which are of the type or class diverted from the file system processes to the array controller processes according to the invention will be referred to in this disclosure "divertible" operations. The class of divertible operations may be defined preferably by file size, although any other file attribute or combination of attributes may be used within the scope of the invention. For purposes of simplifying this disclosure it will be assumed that file size is the attribute used to define whether an operation is divertible or not. Create, delete, read, and write operations which relate to a large file will be divertible operations while file access operations relating to a small file will be non divertible operations, unless an override feature is in place which dictates the treatment of the operation regardless of actual file size. It will be appreciated that the system requires a definition for what constitutes a "large" file. This definition may be simply a threshold file size represented in bytes or any other suitable units.

The method according to the invention includes first receiving a file system access operation request and determining if the request specifies an operation comprising a divertible operation. If the file system access operation request specifies a divertible operation, the method includes diverting the divertible operation from the file system processes to the array controller processes. The method next includes performing the divertible operation with the array controller processes and updating the file system data management arrangement with operation result information from the array controller processes.

The file system data management entry for each file which has been the subject of a divertible create operation is modified from the normal structure used for files which have been the subject of a non-divertible create operation. A normal file system entry for a file may include the file name and various file attributes along with information regarding actual or virtual storage space locations allocated for data making up the file. According to the present invention, however, the file system truncates its data management entry for a file which is the subject of a divertible create operation. Specifically, the entry is truncated to contain a reference to the logical unit to which the file has been assigned rather than information regarding storage space locations allocated for the file by the file system. This logical unit information is supplied by the array controller processes as operation result information, and is in lieu of the file system space allocation information for the file. File system space allocation information for the file is not available or necessary because the file system does not allocate file system space for the file, storage space being allocated and managed instead by the array controller processes.

The operation result information used to update the file system data management arrangement for operations handled directly by the array processes will depend upon the nature of the operation. For a divertible create operation, the operation result information will include the reference to the logical unit at which the array controller processes cause the file to be stored. Where the operation is a divertible read operation, the operation result information may include an indication or receipt from the array controller processes to show that the read operation has been completed. This operation result information is all used to update the file system data management arrangement so that all of the functions of the file system are maintained including particularly the directory and file hierarchy.

A data storage system according to the invention includes a data storage device having a storage medium on which data may be stored. The preferred form of the invention actually includes an array of mass data storage devices such as disk drives. The data storage system also includes one or more data processing devices or data processing means. An input/output arrangement is connected to the data processing means for passing communications between a file system client and the data processing means, while an interface between the data processing means and the data storage device facilitates communications between those elements of the system. The data processing means executes the file system and array controller processes and performs the functions described above with reference to the method according to the invention. Specifically, the data processing means determines whether a file system access operation request includes a divertible operation. If the request includes a divertible operation, the processing means is programmed to pass the divertible operation to the array controller processes so that those processes may perform the operation. The data processing means is also programmed to update the file system data management arrangement using operation result information for the divertible operation.

The data storage system and access method according to the invention provides all of the advantages of both file systems and disk arrays without the normally attendant shortcomings. Particularly, data is managed according to the common file abstraction according to a directory and file hierarchy. Small files may be accessed in the normal fashion with the file system processes cooperating with the array controller processes. However, large files may be accessed directly through the array controller processes even though the access command comprises a file system command and even though the file system hierarchy is maintained. By "direct access" it is meant that the array controller processes deliver a large file from storage to the file system client without having to pass the data for the file through the file system processes. This direct access for large files significantly increases system performance for large files. Furthermore, the system may support both data and device sharing between file system clients and security can be handled as in ordinary file systems.

These and other objects, advantages, and features of the invention will be apparent from the following description of the preferred embodiments, considered along with the accompanying drawings.

DESCRIPTION OF THE PREFERRED EMBODIMENTS

Figure 1:
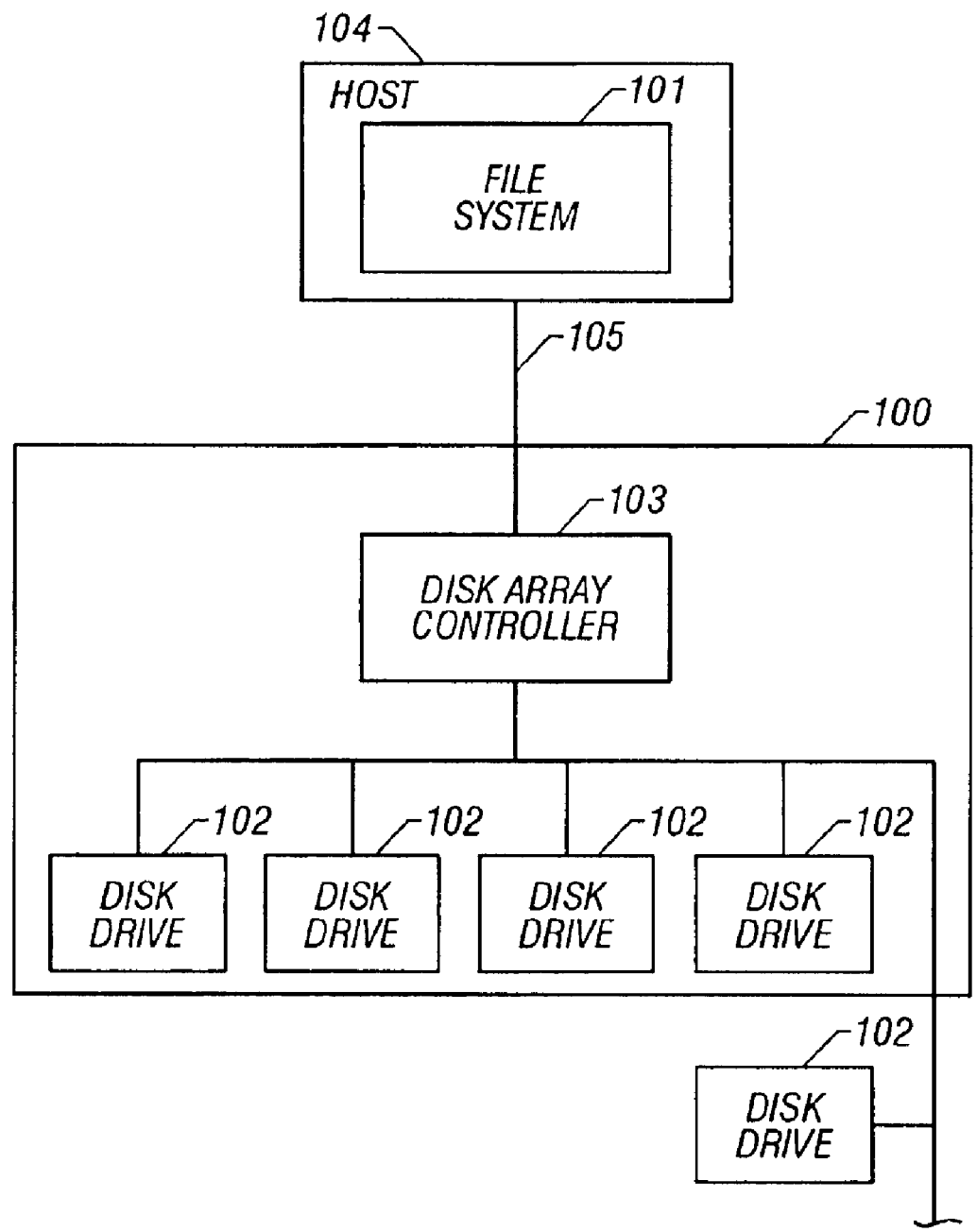
FIG. 1 is a diagrammatic representation of a prior art disk array storage system coupled to a host computer.
Figure 2:
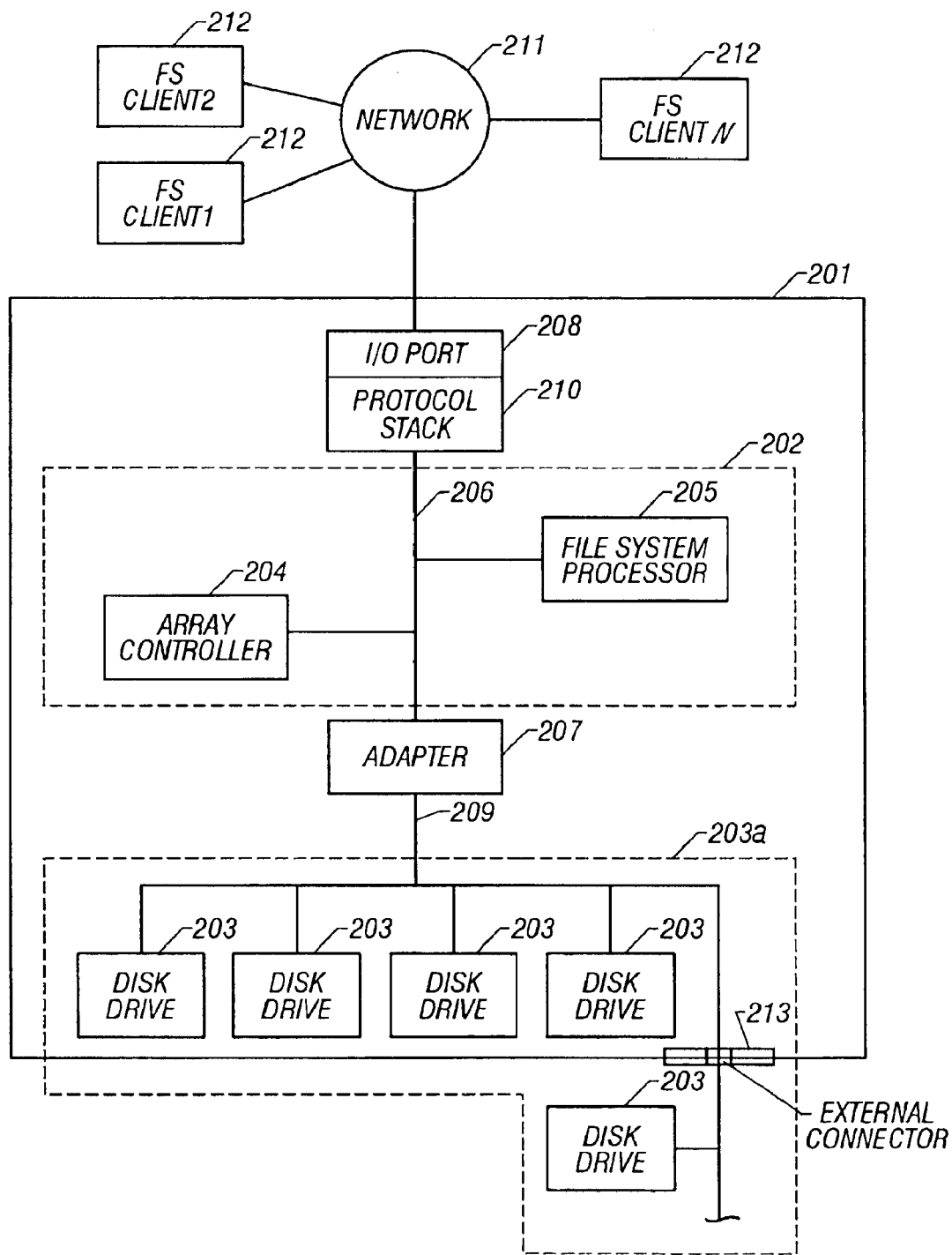
FIG. 2 is a diagrammatic representation of a data storage system embodying the principles of the invention.

Referring to FIG. 2, a data storage system 201 embodying the principles of the invention includes a data processing arrangement 202 and an array 203a of separate storage devices 203. In the form of the invention shown in FIG. 2, data processing arrangement 202 includes two separate processors, an array controller 204 and a file system processor 205. A system bus 206 interconnects the two processors 204 and 205, a storage device adapter 207 and an input/output port 208. The separate adapter 207 shown in FIG. 2 provides an interface to the storage device bus 209. Also, a hardware protocol stack 210 is associated with the input/output port 208 for providing network communication services which allow system 201 to communicate with a computer network 211. Computer network 211 includes one or more file system clients 212 which have file system access to storage system 201. These file system clients 212 represent separate computing devices such as personal computers or workstations on network 211.

Individual storage devices 203 shown in FIG. 2 preferably comprise disk drives or other suitable mass storage devices. Although not shown in FIG. 2, it will be appreciated that these storage devices 203 each include an interface connector and a drive controller. The interface connector allows the respective device to be connected to storage device bus 209, and the drive controller comprises a processing element for executing program code to control the operation of the particular storage device.

The illustrated storage system 201 may be housed in an enclosure (not shown) housing data processing arrangement 202, input/output port 208 and protocol stack hardware 210, storage device interface adapter 207, and one or more storage devices 203. The illustrated storage device bus 209 includes an external connector 213 for connecting additional storage devices external to the system enclosure.

The particular structure of the storage system 201 illustrated in FIG. 2 is shown only as one preferred form of the invention. Many variations on the structure are possible within the scope of the invention. For example, although two separate data processing devices 204 and 205 are shown in FIG. 2, it will be appreciated that all of the data processing functions required in the invention be performed on a single data processing device or may be divided between more than two data processing devices. Also, the functions provided by storage device interface adapter 207 shown in FIG. 2 may be performed by a processing device included in processing means 202. The functions provided by protocol stack 210 shown in FIG. 2 may likewise be performed by some other processing arrangement in the system such as processing means 202. Furthermore, although one external storage device 203 and four internal storage devices 203 are shown for purposes of example in FIG. 2, the invention is not limited to this or any other number of storage devices. Although the invention is not limited to any particular type of storage devices, the devices may be SCSI devices in which case bus 209 would comprise a SCSI bus, and adapter 207 would comprise a SCSI adapter. System bus 206 may comprise any suitable bus standard such as PCI for example.

Those skilled in the art will also appreciate that it is possible to implement the present invention in connection with a host computer rather than as a stand alone network unit illustrated in FIG. 2. In this alternate implementation, the array controller processor and storage device adapter may be implemented on an add-on card such as a PCI card to be connected on the PCI bus of a host computer and the storage devices could all be external to the host computer. The processes performed by the file system processor 205 in FIG. 2 would be performed by a processor of the host computer in this alternate form of the invention, and the host computer's input/output port and protocol stack could be employed for network communications.

Figure 3:
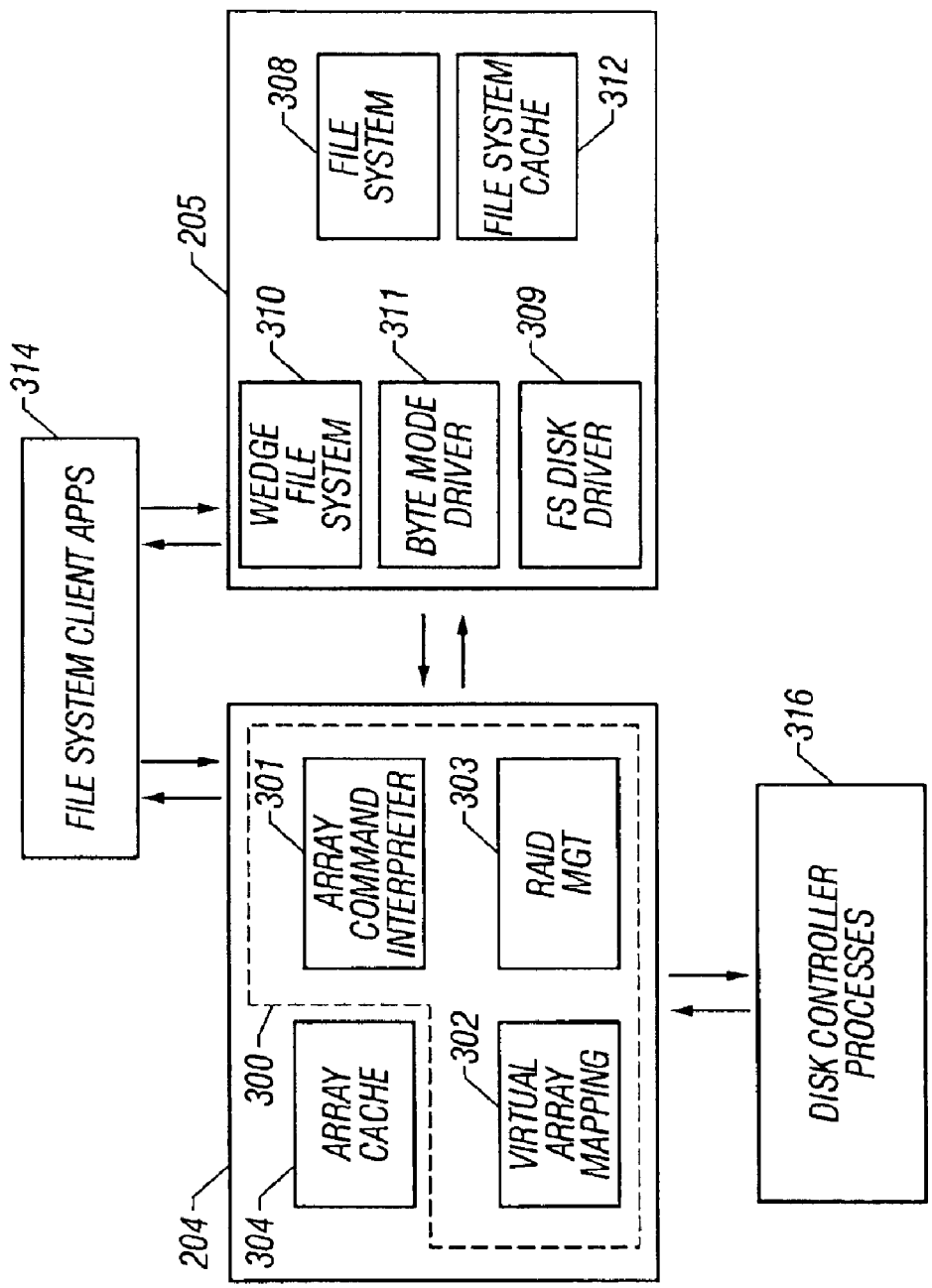
FIG. 3 is a diagrammatic representation showing groupings of various software processes which operate in the data storage system shown in FIG. 2.

FIG. 3 shows further detail of the program processes performed by data processing arrangement 202 under the control of computer program code according to the invention. Array controller 204 performs or executes a number of program processes each indicated in a separate box included in the box 204 in FIG. 3. These array controller program processes are implemented through array controller program code and are referred to in this disclosure collectively as array controller processes 300. In the illustrated form of the invention array controller processes 300 include an array command interpreter 301, virtual array mapping component 302, and RAID management component 303. These elements each represent computer program code executed by the array controller 204 to perform various array controller functions. FIG. 3 also shows an array cache 304 associated with array control processor 204. This array cache may comprise random access memory associated with the array controller or may comprise battery-backed random access memory. The memory is used to cache data being transferred to and from the storage devices under control of the array controller processes 300.

Figure 7:
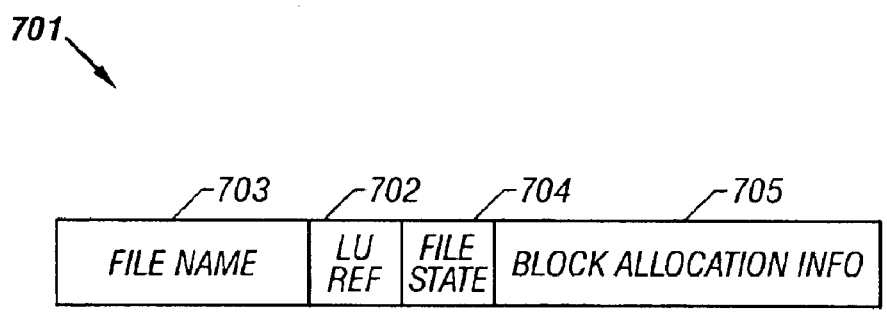
FIG. 7 is a representation of an entry in an array controller data management arrangement according to the invention.

Array command interpreter 301 shown in FIG. 3 is responsible for receiving a data storage device-related command and converting the command to instructions or calls for the other array controller processes. In the preferred form of the invention, array command interpreter 301 also includes byte access conversion program code for converting the byte offset access instruction resulting from a divertible operation to a block access instruction as will be discussed further below. Virtual array mapping component 302 provides an array data management arrangement which relates data stored on the storage devices to logical units and to blocks of storage space. An entry in this array data management arrangement is shown in FIG. 7 described below. Virtual mapping component 302 is also preferably responsible for creating and assigning logical units for the data to be stored across the device array 203a. RAID component 303 is responsible for managing the storage device array 203a and for communications with the virtual array mapping component. RAID component 303 also implements any data storage redundancy schemes or RAID schemes supported by storage system 201. Array controller processes are well known in the art of disk arrays and RAID systems and will not be described in further here so as not to obscure the invention in unnecessary detail.

File system processor 205 shown in FIGS. 2 and 3 performs or executes a number of program processes, each implemented through computer program code. Each process is indicated in a separate box included in box 205 shown in FIG. 3. In addition to the file system processes or file system 308 implemented through file system program code, file system processor 205 executes a disk driver component 309, a wedge file system component 310, and a byte mode driver component 311. Each of these components represents program processes implemented by computer program code executed by file system processor 205. FIG. 3 also shows a file system cache 312 which comprises random access memory associated with file system processor 205. File system cache 312 provides storage space for caching file data being communicated ultimately to and from data storage devices 203 shown in FIG. 2.

It will be appreciated that the file system processes shown at block 308 in FIG. 3 include all program processes required for implementing the desired file system. In particular, file system processes 308 provide a file system data management arrangement. The file system data management arrangement includes one or more data tables which relate each file in the file system to various file attributes. Also, as will be discussed further below, the file system data management tables relate each file to either storage device allocation information or a reference to a logical unit created and managed by array controller processes 300. For communications to the array controller processes 300, file system processes 308 rely on disk driver component 309. This disk driver component 309 includes computer program code for communicating file system data access commands from the file system processes 308 to the array controller processes 300 to access certain file system data stored at the data storage devices 203. In particular, disk driver component 309 provides any necessary encoding of instructions and data communicated between the file system processes 308 and the array controller processes. It will be appreciated that the disk driver component may be considered as being included in the file system processes 308, but is shown separately in this disclosure to better describe its particular function.

As with most of the array controller processes 300, the specific implementations and operation of file system processes 308 and disk driver component 309 are within the ordinary skill in the art. Therefore, implementation and operational details will be described in this disclosure only as necessary to clearly and completely disclose the present invention.

Wedge file system component 310 implements special file system processes interposed between file system clients (212 in FIG. 2) and file system processes 308. As will be described in further detail with reference to FIGS. 4 and 5, wedge file system component 310 receives file system access operation requests from file system clients and determines whether the request includes a divertible operation. The determination is performed by operation detection program code included in the wedge file system. Wedge file system component 310 passes non divertible operations to file system processes 308. This processing of non divertible operations through file system processes 308 occurs just as in a prior art file system. However, when wedge file system component 310 detects a divertible operation, it blocks the operation from reaching file system processes 308, and instead diverts the divertible operation to be processed by the array controller processes 300 executed at array controller 204. Further details of the operation of wedge file system component 310 will be described below with reference to FIGS. 4 and 5.

Utilizing the wedge file system component 310 as shown in FIG. 3 to intercept file system access operation requests has the advantage that the operation detection function may be implemented without making changes to the program code implementing file system processes 308. However, it will be appreciated that the divertible operation detection function described above with reference to wedge file system component 310 may alternatively be provided by modifying file system processes 308. In this alternate implementation, divertible operations would reach file system processes 308 but would not be processed and instead be diverted to array controller processes 300. This alternate implementation is to be considered an equivalent to the wedge file system component implementation set out in detail in this disclosure.

Byte mode driver component 311 comprises program code for conveying commands for a divertible access operation to array controller processes 300, and particularly to array command interpreter component 301. The conveyance functions performed by byte mode driver component 311 for divertible operations are analogous to the functions provided by disk driver component 309 with respect to non divertible operations.

As indicated in FIG. 3, the program processes performed at array controller 204 and file system processor 205 communicate with each other and also both communicate with file system client applications 314 comprising software executed at file system clients 212 in FIG. 2. Array controller 204 also communicates with disk controller processes 316. Disk controller processes 316 comprises program code executed at the controller (not shown) associated with each data storage device 203 in FIG. 2.

The method of the invention and operation of the various program processes may be described with reference to FIGS. 4 and 5. As shown at process block 501 in FIG. 5, the method includes receiving a file system operation request. This file system access operation request is received from a file system client 212 in FIGS. 2 and 4, through communications facilities provided by protocol stack 210 also shown in those figures. The access operation request is received by the wedge file system component 310 in the preferred form of the invention. As mentioned above, this wedge file system component 310 is interposed between the file system processes 308 and file system clients 212. A component referred to as a virtual file system interface may be used in certain file systems to insert file system modifications ahead of the file system components or to insert an additional or alternative file system. Thus, the file system processes 308 employed according to the preferred form of the invention illustrated in the figures must support a virtual file system interface or other method for inserting wedge file system component 310.

The method next includes the step of determining whether the file system access operation request includes a divertible operation. This step is shown at decision block 502 in FIG. 5 and is performed by the wedge file system component 310 in the illustrated form of the invention. As discussed above, it will be assumed for purposes of this disclosure that file system access operations are generally defined as divertible or not divertible based on the size of the file (amount of data making up the file) which is the subject of the access operation request. This diversion based on file size has the effect of causing all files over the predetermined threshold size to be handled or processed directly by array controller processes 300 and causing all files below the threshold size to be handled or processed normally through file system processes 308. The preferred form of the invention also includes a mechanism for overriding the normal rules for determining if an operation is a divertible operation. Again, although the invention is described here for purposes of example as using file size to determine whether an operation is divertible, other file attributes and other standards or combinations of attributes and standards may be used within the scope of the accompanying claims in defining access operations as divertible or non divertible.

Any suitable method may be used for making the determination at decision block 502. In particular, in the example that the determination is based on the size of the file which is the subject of the received operation, wedge file system component 310 may obtain file size information from the file system data management arrangement associated with file system processes 308. Thus, the decision step at block 502 may include sending a request for the necessary file size information from wedge file system component 310 to the file system processes 308. Alternatively, it may be preferable or necessary for the wedge file system to obtain the necessary file size information from the incoming file access operation request, in which case the decision step at block 502 would include reading file size information from the incoming operation request. However, if file size information is not available for the file which is the subject of the incoming file access operation request, it may be necessary for wedge file system component 310 to be programmed to make an assumption as to the size of the file. It may alternatively be possible for wedge file system component 310 to obtain file size information from the file system client 212 issuing the request, although current file systems do not support such a function.

Alternatively, some preferred forms of the invention may associate a special attribute with each file. In the present example in which the subject file size is used in determining if an operation is divertible, the file system may be modified to set a file state attribute as either "large" or "small," and this attribute may be stored in the file system data management arrangement implemented by file system processes 308. The step of determining if the operation is a divertible operation then comprises simply reading the file state attribute stored at the file system data management arrangement for the file which is the subject of the access operation. This file state attribute also provides a convenient method for overriding the standard rules. That is, an override feature of the wedge file system may cause the file state attribute to be stored as the override state regardless of the actual file size. Otherwise some other code or flag may be used in the wedge file system component 310 to ensure a particular operation is to be treated as divertible or non divertible regardless of the actual file attributes.

It should be noted that certain file access operations may not be divertible operations regardless of the file attributes of the file which is the subject of the file access operation request. In particular, file open and close operations at the file system level cannot be divertible operations since those operations do not involve reading or writing data for the subject file to the storage devices 203 and do not involve storage space allocations. Thus, there is never a reason to divert an open or close operation around the file system processes 308.

Figure 5:
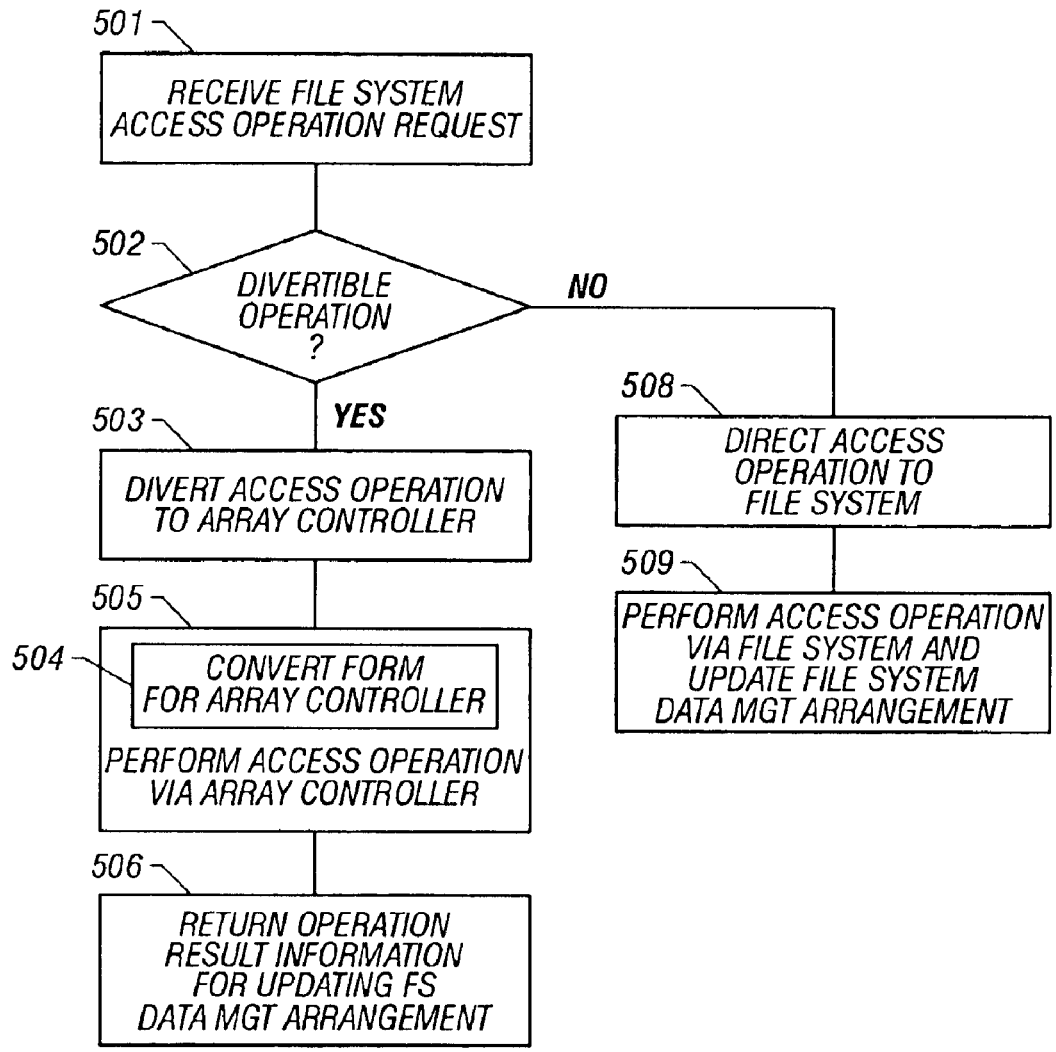
FIG. 5 is a flowchart showing the process steps performed according to the invention.

If the operation is determined to be a divertible operation, wedge file system 310 diverts the operation to array controller processes 300 as shown at process block 503 in FIG. 5. In the preferred form of the invention, the method also includes converting the diverted file system operation from a byte offset definition to a block access definition. This conversion step is shown at process block 504 in FIG. 5. This conversion from byte offset and byte length to block offset and block length is preferably performed by program code included in or associated with array command interpreter 301 using memory available at array controller 204. It will be noted that a similar conversion is part of the normal operation of the file system processes 308. In each case the conversion includes dividing byte offset and length data by the number of bytes in each block of storage space defined for storage devices 203. Blocks are commonly defined as 512 byte storage spaces, although the invention is not limited to this block size.

Once the diverted file system operation is converted to a block access form at array command interpreter 301, the operation is performed as shown at step 505 in FIG. 5. Performing the requested operation includes generally the normal steps in an array access. In particular, array command interpreter 301 takes the code or instruction representing the diverted operation and issues calls or commands to the associated processes depending upon the nature of the operation. For a read operation, the array mapping component 302 determines the block allocations associated with the pre-existing file to be read. The RAID management component 303 then issues an appropriate command to the device or devices 203 to read the data stored at the identified blocks. In a write operation, mapping component 302 maps the file data to blocks within the logical unit assigned to the file. RAID management component 403 then issues a command to the storage device or devices 203 to write the received data to the mapped blocks.

There is a notable difference in the performance of divertible read and write operations as compared with read and write operations to a storage array performed in prior art systems. In the preferred form of the invention, data for the read and write operations is transferred directly between the array controller processes 300 and the file system clients (212 in FIGS. 2 and 4), completely bypassing the file system processes 308. The data bypass path is discussed in the following paragraph with reference to FIG. 4. With respect to divertible read operations in which file data is returned as directed by the file system client 212, this bypassing of the file system processes requires that the array controller processes 300 be adapted to format the data message according to the standards of the file system. This formatting of the data read from devices 203 in response to a divertible read operation is preferably performed by file system formatting program code included in array command interpreter 301.

Figure 4:
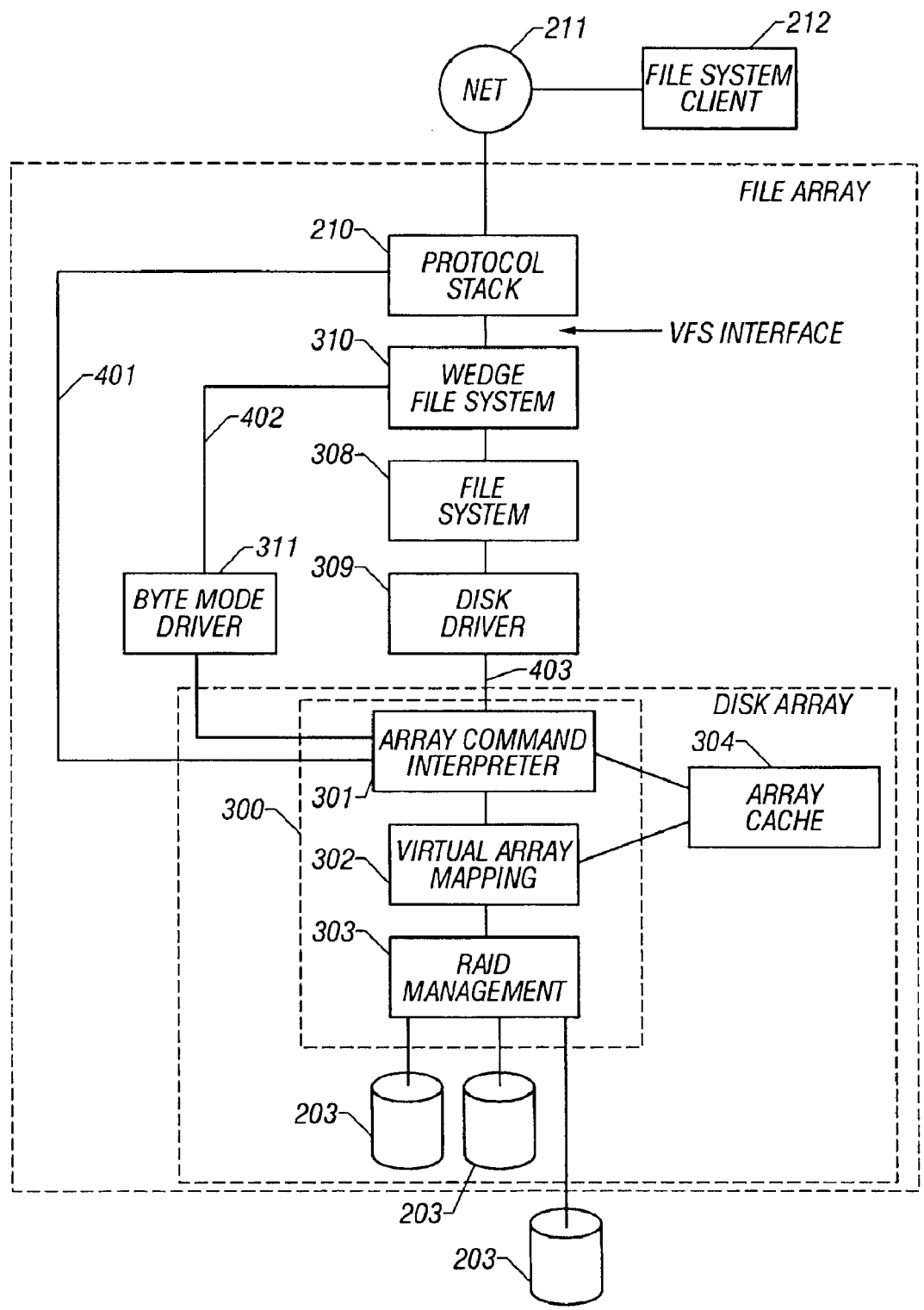
FIG. 4 is a diagrammatic representation showing the interactions between the various software processes shown in FIG. 3.

FIG. 4 shows three separate paths to array command interpreter 301. Path 401 runs from protocol stack 210 to interpreter 301. This path 401 is shown to indicate that the file data associated with a divertible operation completely bypasses file system processes either passing to or from the storage devices 203. Path 402 shows a path between wedge file system component 310 and interpreter 301 to indicate that commands and receipts associated with divertible operations pass between these two processes. Path 403 between disk driver component 309 and array command interpreter 301 is shown in FIG. 4 to indicate that commands, receipts, and file data associated with a non divertible file system access operation pass between disk driver 309 and array command interpreter 301 as will be discussed further below.

As shown at process block 506 in FIG. 5, the method also includes the step of updating the file system data management arrangement with information about the results of the executed divertible access operation. Since the invention maintains the desired file hierarchy through the file system data management arrangement, the tables making up the arrangement must be updated in order to maintain the correct information regarding the file which is the subject of a divertible access operation executed directly through array controller processes 300. Array controller processes 300 facilitate this update of the file system data management arrangement by communicating operation result information to the file system processes 308. The nature of the operation result information depends upon the nature of the divertible access operation which has been performed. For a create operation diverted to and performed by array controller processes 300, the result information includes a reference to a logical unit assigned for the file by the array controller processes, particularly the array mapping component 302. For a divertible read or write operation, the operation result information may comprise a receipt or message indicating the completion of the particular operation. In any event, the operation result information may be communicated directly back to file system processes 308 or communicated through wedge file system component 310.

Returning to decision block 502, if the access operation request is determined to include an operation which is not a divertible operation, wedge file system component 310 passes the operation directly to file system processes 308 as indicated at process block 508. File system processes 308 then perform the operation at block 509 as in prior art systems. With a read operation for example, the file system data management arrangement is consulted to determine the locations allocated for the file. File system processes 308 then construct and issue the appropriate command, and disk driver component 309 encodes and conveys the command to array command interpreter 301. It will be noted that the conversion of byte access to block access is performed by file system processes 308 in this case. The processes at array controller 204 respond to the communication from disk driver component 309 by causing the data to be read from the specified blocks within the logical unit allocated for the file system. The data is cached at both the array cache 304 and the file system cache 312 and then returned as directed by the file system read operation request which prompted the access.

In the case of a non divertible write operation, file system processes 308 update the file system data management arrangement for the virtual storage space locations allocated for the file data. The file system processes 308 then use disk driver component 309 to communicate with array controller processes 300 to provide the file data and the file system space allocation information required to write the data. The data is written to the specified blocks allocated for the file in the logical unit assigned for the file system.

It will be noted that according to the preferred form of the invention, a single logical unit of the disk array implementation is devoted for storing small files which are processed through file system processes 308 in the normal fashion. However, all large files (in this example where file size determines the class of divertible operations) are processed directly through array controller processes as indicated by path 401 in FIG. 4 and are preferably each allocated their logical unit by array controller processes 300.

The embodiment of the invention shown in the figures shows the file system interacting with the array controller processes 300 without the aid of a volume manager software component. However, those skilled in the art will appreciate that the invention may be implemented using volume manager software processes interposed between the file system 308 and array controller processes 300. The volume manager would function to make multiple logical units of the disk array to appear as a single logical unit to the file system 308.

In a file system implementation, an open operation precedes a read or write operation. The separate open operation is used to prevent conflicts between file system clients 212 (FIGS. 2 and 4) accessing a common file. The file system such as system 308 also creates a temporary data structure for use in accessing files. Among other functions, this temporary data structure relates each file to a handle or other identifier and stores additional file management information from the file system data management arrangement in order to accelerate processing of subsequent read and write operations.

In the preferred form of the invention, wedge file system 310 includes temporary data structure program code which creates and manages a similar temporary data structure for files that may be the subject of divertible operations. Each record in this wedge file system temporary file structure preferably includes a file handle, the file name, and a logical unit identifier. The logical unit identifier comprises an identifier for the logical unit to which the respective file has been stored according to a divertible operation. This wedge file system temporary file structure helps accelerate the processing of a divertible operation for a specified file by having required access information for the specified file readily available at the time the divertible operation is received.

Figure 6:
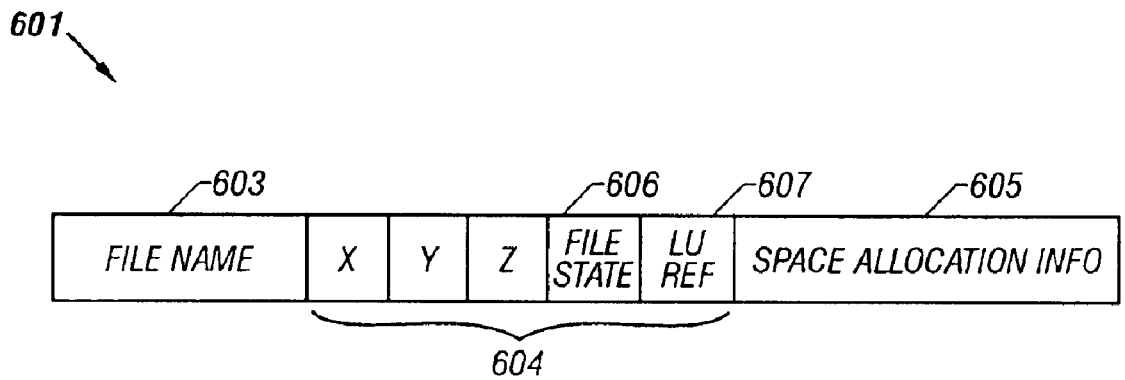
FIG. 6 is a representation of an entry in the file system data management arrangement according to the invention.

FIGS. 6 and 7 show portions of the data management arrangements used by the file system processes 308 and array controller processes 305, respectively. Referring first to FIG. 6, a file system data management entry is shown at 601. In this preferred form of the invention, each entry includes a file name field 603, a group 604 of file attribute fields, and a field 605 containing information regarding file system storage space allocation. Attribute field 606 stores a file state attribute in the preferred form of the invention. This file state attribute defines the file as either a small file or a large file. Attribute field 607 provides a location for storing a reference to a logical unit to which the subject file is stored. For small files, there is no value in this logical unit attribute field 607 because array controller processes 300 do not directly manage small files and do not assign small files their own logical unit. Rather, small files are handled, according to the invention, by file system processes 308. File system processes 308 allocate storage space for the file within a single logical unit assigned for the file system by array controller processes 300. This allocation information is stored in field 605 for a small file. In contrast, file system space allocation field 605 is preferably left blank in a large file entry, while logical unit reference attribute field 607 stores the reference to the logical unit at which the large file is stored through the array controller processes 300. Space allocation field 605 may be left blank for a large file because storage space is allocated for the file and managed by the array controller processes 300. Thus, it is not necessary for the file system data management arrangement to have any storage space allocation information for the respective file.

It will be noted that both the file state attribute and logical unit reference attribute represent externally defined attributes since they are not attributes normally defined in a file system. Thus, the file system must support externally defined file attributes in order to implement this preferred form of the invention. Most modern file systems do support such externally defined file attributes.

Referring to FIG. 7, the data management arrangement for array controller processes 300 includes an entry 701 for each file which is handled directly by the array controller processes according to the invention. In other words, an entry 701 is created for each file subject to a divertible operation. Each entry 701 includes a logical unit reference field 702 and a file name field 703. Logical unit reference field 702 stores a reference to a logical unit at which the particular file is stored. File name field 703 stores the file name associated with the file for which the entry 701 is made. Entry 701 further includes field 705 containing storage space allocation information indicating the blocks of storage space allocated for the respective file.

One preferred form of the invention includes an arrangement for accommodating a change in a file state. This form of the invention allows a file to be moved or migrated from large file state to small file state and vice versa. This migration between large and small file state may be accomplished a number of ways. For example, the file states described above may be expanded to include a "growing" file state and a "shrinking" file state. A growing file state means that the file is growing from a small file to a large file as defined according to the system. A shrinking file state means that the subject file was once treated as a large file but is becoming sufficiently smaller to qualify as a small file for handling through the file system. This migration may occur as the file is modified or as a separate process after the file has been modified. The effect of the change in state is to change how file system access operations specifying the file will be handled in the future, and which path 401 or 403 will be taken for file data in future access operations to the file.

The above described preferred embodiments are intended to illustrate the principles of the invention, but not to limit the scope of the invention. Various other embodiments and modifications to these preferred embodiments may be made by those skilled in the art without departing from the scope of the following claims. In particular, it will be appreciated that the arrangement of processing devices to execute the various program processes according to the invention is shown only for purposes of example. The various processes may be distributed across processing devices in any suitable fashion to perform the desired functions within the scope of the invention and the following claims. Also, the various software components shown in the figures are shown and described only for purposes of example and are divided generally in a fashion which most clearly describes the invention. However, the various software functions may be performed by differently named and arranged software components. These different software arrangements are to be considered equivalent to the arrangement set out in the present disclosure and the accompanying claims.

What is claimed is:

1. A method for accessing a data storage device controlled by array controller processes, the method including the steps of:
    (a) receiving a file system access operation request;
    (b) determining if the file system access operation request specifies a file system access operation comprising a divertible operation;
    (c) if the file system access operation request specifies a divertible operation, diverting the divertible operation from file system processes associated with the data storage device to the array controller processes;
    (d) performing the divertible operation with the array controller processes; and
    (e) updating a file system data management arrangement with operation result information from the array controller processes, the file system data management arrangement being controlled by the file system processes.

2. The method of the claim 1 wherein the operation comprises a create operation and wherein the operation result information includes a reference to the array storage space to which data for the file specified in the create operation is to be written.

3. The method of the claim 2 wherein the step of updating the file system data management arrangement includes causing the file system processes to produce an entry in the file system data management arrangement which includes identifying information for the specified data and a reference to the array storage space to which the specified data is to be written.

4. The method of claim 1 wherein the divertible operation comprises a read operation and further including the step of reading an array storage space reference for the file specified in the read operation.

5. The method of claim 4 wherein:
    (a) performing the divertible operation comprises reading data from blocks allocated to the space identified by the array storage system space reference; and
    (b) the operation result information includes an indication that the read operation is complete.

6. The method of claim 5 wherein the step of the updating the file system data management arrangement includes causing the file system processes to modify access data in an entry for the file specified in the read operation.

7. The method of the claim 1 wherein the step of the determining if the file system access operation request includes a divertible operation is performed with a wedge file system interposed between a file system client and the file system processes associated with the data storage apparatus.

8. The method of claim 7 wherein the step of determining if the file system access operation request includes a divertible operation comprises reading a file attribute for the file specified in the file system access operation request.

9. The method of claim 7 wherein the step of the determining if the file system access operation request includes a divertible operation comprises reading a file size included in the file system access operation request.

10. The method of claim 1 further including the step of modifying the divertible operation to a form suitable to be performed by the array controller processes.

11. The method of claim 10 wherein the step of modifying the divertible operation comprises converting the operation from a byte offset operation to a block access operation.

12. The method of claim 1 wherein the step of determining if the file system access operation request includes a divertible operation is performed by the file system processes.

13. The method of claim 1 wherein the divertible operation comprises a write or a create operation and the step of performing the divertible operation with the array controller processes includes passing data for a file specified in the divertible operation directly from a file system client to the array controller processes.

14. The method of claim 1 wherein the divertible operation comprises a read operation and the step of performing the divertible operation with the array controller processes includes passing data for a file specified in the divertible operation directly from the array controller processes to a file system client.

15. A program product for servicing file system access operation requests from a file system client, the program product stored on a computer readable medium and including:
  (a) operation detection program code for detecting file system access operations comprising divertible operations and file system access operations comprising non-divertible operations in a received file system access operation request, and for diverting divertible operations from file system processes associated with a data storage device;
  (b) file system program code for implementing the file system processes and thereby performing each non-divertible operation included in a received access operation request and maintaining a file system data management arrangement which includes information for each file in the file system; and
  (c) array controller program code for performing each divertible operation, managing a data storage device including data storage media, and communicating with the file system program code to update the file system data management arrangement in response to the performance of a divertible operation.

16. The program product of claim 15 wherein the operation detection program code comprises wedge file system program code operable between a file system client and the file system program code.

17. The program product of claim 15 wherein the array controller program code includes byte access conversion program code for converting byte offset access instructions in a divertible operation to block access instructions.

18. The program product of claim 15 wherein the operation detection program code includes temporary data structure program code for creating a temporary data structure containing information from the file system data management arrangement on a file specified in a received access operation request.

19. The program product of claim 15 wherein the operation detection program code is incorporated into the file system program code.

20. The program product of claim 15 wherein the array controller program code includes file system formatting program code for formatting data messages according to a file system standard for a file system implemented by the file system program code.

21. A program product for servicing file system access operation requests from a file system client to a file system including a file system data management arrangement which contains information on each file in the file system, the program product stored on a computer readable medium and including:
  (a) operation detection program code for detecting file system access operations comprising divertible operations in a file system access operation request received from a file system client, and for preventing each divertible operation from being performed by the file system; and
  (b) array controller program code for performing each divertible operation, managing a data storage device including data storage media, and communicating with the file system program code to update the file system data management arrangement in response to the performance of a divertible operation.

22. The program product of claim 21 wherein the operation detection program code comprises wedge file system program code operable between a file system client and the file system program code.

23. The program product of claim 21 wherein the array controller program code includes byte access conversion program code for converting byte offset access instructions in a divertible operation to block access instructions.

24. The program product of claim 21 wherein the operation detection program code includes temporary data structure program code for creating a temporary data structure containing information from the file system data management arrangement on a file specified in a received access operation request.

25. The program product of claim 21 wherein the array controller program code includes file system formatting program code for formatting data messages according to a file system standard for a file system implemented by the file system program code.

26. A data storage system comprising:
  (a) a data storage device;
  (b) data processing means for,
    (i) determining whether a file system access operation request includes a file system access operations comprising a divertible operation,
    (ii) if the file system access operation request includes a divertible operation, diverting the divertible operation from file system processes associated with the data storage device to array controller processes executed by the data processing means,
    (iii) performing the divertible operation with the array controller processes, and
    (iv) updating a file system data management arrangement with operation result information for the divertible operation from the array controller processes;
  (c) an input/output arrangement connected to the data processing means for passing communications between a file system client and the data processing means; and
  (d) an interface between the data processing means and the data storage device.

27. The apparatus of claim 26 wherein the data processing means comprises:
  (a) an array controller executing the array controller processes; and
  (b) a file system processor executing file system processes and maintaining the file system data management arrangement.

28. The apparatus of claim 26 wherein the input/output arrangement includes:
  (a) an input/output port having a physical input/output connection; and
  (b) a network protocol stack component operatively connected to the input/output port.

29. The apparatus of claim 28 wherein the network protocol stack component provides network interface facilities for both the array controller and the file system processor.

* * * * *

UNITED STATES PATENT AND TRADEMARK OFFICE
CERTIFICATE OF CORRECTION

PATENT NO. : 6,904,441 B2
APPLICATION NO. : 09/819265
DATED : June 7, 2005
INVENTOR(S) : Douglas L. Voigt It is certified that error appears in the above-identified patent and that said Letters Patent is hereby corrected as shown below:

In column 3, line 40, before ""divertible"" insert -- as --.

In column 9, line 8, after "or" delete "not" and insert -- non --, therefor.

In column 14, line 20, in Claim 2, after "wherein the" insert -- divertible --.

In column 14, line 28, in Claim 3, after "specified" insert -- file --.

In column 14, line 46, in Claim 7, delete "includes" and insert -- specifies --, therefor.

In column 14, line 51, in Claim 8, delete "includes" and insert -- specifies --, therefor.

In column 14, line 55, in Claim 9, delete "includes" and insert -- specifies --, therefor.

In column 14, line 65, in Claim 12, delete "includes" and insert -- specifies --, therefor.

In column 15, line 25, in Claim 15, after "included in" delete "a" and insert -- the --, therefor.

In column 15, line 34, in Claim 15, after "of a" insert -- respective --.

In column 15, line 37, in Claim 16, after "between" delete "a" and insert -- the --, therefor.

In column 15, line 41, in Claim 17, after "in" delete "a" and insert -- the respective --, therefor.

In column 15, line 46, in Claim 18, after "in" delete "a" and insert -- the --, therefor.

In column 15, line 54, in Claim 20, after "for" delete "a" and insert -- the --, therefor.

In column 16, line 4, in Claim 21, after "update" delete "the".

In column 16, line 6, in Claim 21, after "of a" insert -- respective --.

In column 16, line 10, in Claim 22, after "between" delete "a" and insert -- the --, therefor.

UNITED STATES PATENT AND TRADEMARK OFFICE
CERTIFICATE OF CORRECTION

PATENT NO. : 6,904,441 B2
APPLICATION NO. : 09/819265
DATED : June 7, 2005
INVENTOR(S) : Douglas L. Voigt It is certified that error appears in the above-identified patent and that said Letters Patent is hereby corrected as shown below:

In column 16, line 15, in Claim 23, after "in" delete "a" and insert -- the respective --, therefor.

In column 16, line 25, in Claim 25, after "for" delete "a" and insert -- the --, therefor.

In column 16, line 31, in Claim 26, after "access" delete "operations" and insert -- operation --, therefor.

In column 16, line 53, in Claim 27, after "executing" insert -- the --.

In column 16, line 56, in Claim 28, delete "claim 26" and insert -- claim 27 --, therefor.

Signed and Sealed this

Eleventh Day of August, 2009

David J. Kappos
*Director of the United States Patent and Trademark Office*